Figure 1:
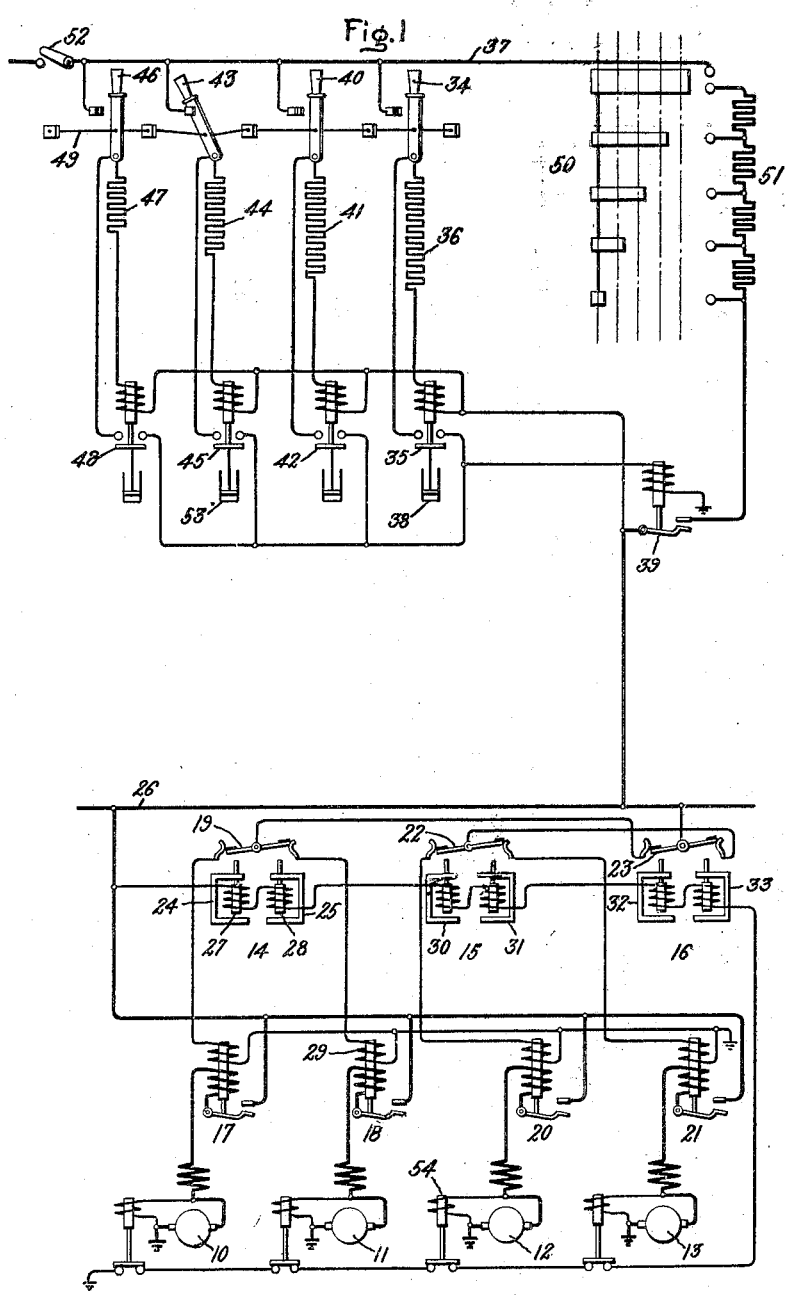

March 18, 1924.

C. B. CONNELY 1,487,315

SELECTIVE CONTROL SYSTEM

Filed March 25, 1922

3 Sheets-Sheet 3

Inventor:
Charles B. Connely,
by Albert G. Davis
His Attorney

Patented Mar. 18, 1924.

1,487,315

UNITED STATES PATENT OFFICE.

CHARLES B. CONNELY, OF NEW ORLEANS, LOUISIANA, ASSIGNOR TO GENERAL ELECTRIC COMPANY, A CORPORATION OF NEW YORK.

SELECTIVE CONTROL SYSTEM.

Application filed March 25, 1922. Serial No. 546,776.

*To all whom it may concern:*

Be it known that I, CHARLES B. CONNELY, a citizen of the United States, residing at New Orleans, in the parish of Orleans, State of Louisiana, have invented certain new and useful Improvements in Selective Control Systems, of which the following is a specification.

My invention relates to an improved selective control system and apparatus whereby any desired portion of a plurality of separate paths from a supply conductor may be selected and established at will.

The invention has a particular application in the control of the direction of operation of an electric vehicle at a point remote from the vehicle, although the invention is not necessarily limited to such use.

In one of its aspects, my invention relates to improvements in the selective control system for which John Eaton filed an application for patent on January 4, 1922, Serial No. 526,983, the said application being assigned to the same assignee as this invention. In the said Eaton application there is described and claimed a selective control system whereby any desired portion of a purality of paths from a single supply conductor may be selected at will by controlling the potential of the conductor so as to thereby control the value of current through an electroresponsive selector device energized from the conductor. A series lockout type relay is employed as a selector device, the arrangement being such that when one predetermined value of current is permitted to pass through the relay, a switch member of the relay is magnetically held in a biased position to select one path from the conductor, and when a smaller predetermined value of current is permitted to initially pass through the relay, the relay will operate its switch member to a second position and magnetically hold the switch member in the second position to cause the selection of another path from the supply conductor. The system is particularly adapted to the control of the direction of operation of a motor vehicle by controlling the potential of the trolley wire conductor at a point remote from the vehicle. The potential of the trolley wire to cause the desired selection is controlled by a master controller having a plurality of operative positions, the position of the controller determining the particular path to be selected. In case of a temporary voltage failure or in case the trolley of the vehicle controlled should temporarily leave the trolley wire, or in case of other conditions producing similar results, if the power supply is restored without the controller being returned to its off position, a selection which is not desired may be automatically effected.

One of the objects of my invention is to provide an improved arrangement whereby the desired selection is always obtained regardless of the occurrence of the conditions referred to; that is, in case the controlled circuit is deenergized for any reason, the operator is required to do a definite thing before the supply of power to the control circuit can be restored. Unintentional operation is therefore prevented.

Another object of the invention is the provision of an improved selector device which will be positive and reliable in operation.

Another object of the invention is the provision of an improved selective control system for the control of electric vehicles whereby the vehicles are protected by a block system so that collisions between vehicles are prevented.

Another object of the invention is the provision of an improved arrangement whereby vehicles may be advanced from one block to another at the will of the operator.

These and other objects as will hereinafter appear and as will be apparent to those skilled in the art are attained by the system and apparatus illustrated in the accompanying drawings which illustrate an embodiment of the invention for the purpose of explaining the principles thereof, and in which:—

Figure 2:
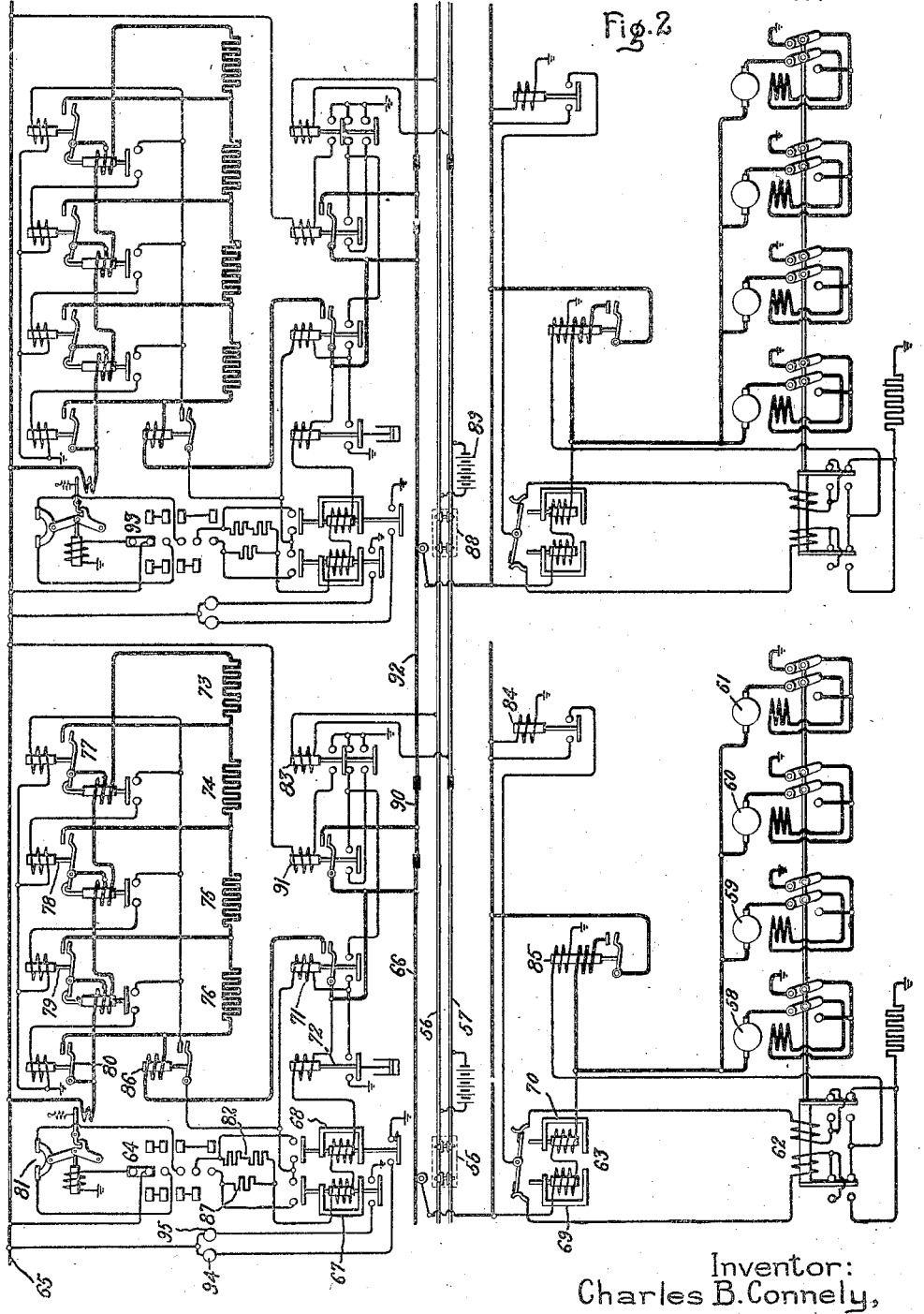
Figure 3:
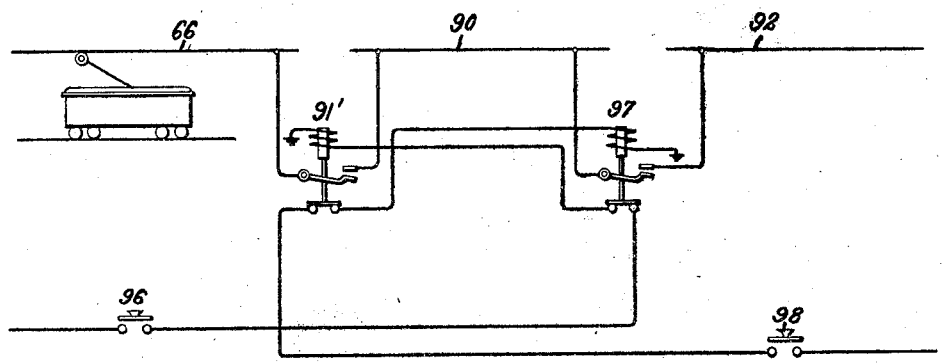
Figure 4:
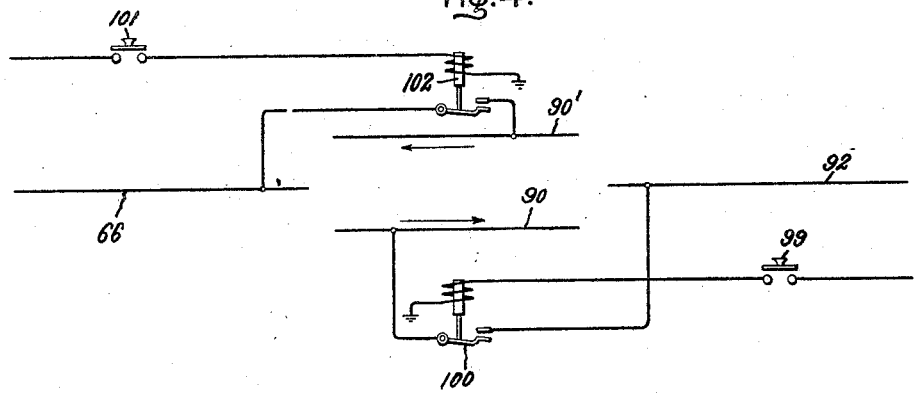

Fig. 1 shows a selective control system for selecting at will from a remote point any one of a plurality of motors to be energized from a single supply conductor by controlling the initial potential of the conductor; Fig. 2 shows a system of selective control in a block system for controlling the operation of electric vehicles; Fig. 3 is a very simplified diagram of an arrangement for controlling a vehicle on one block from an adjacent block; and Fig. 4 is a very simplified diagram of an arrangement for controlling the passing of vehicles between blocks.

Referring to the drawings, and in particular to Fig. 1, the electric motors 10, 11, 12 and 13 are adapted to be selectively controlled by means comprising the selector relays 14, 15 and 16. The selector relay 14 is provided for controlling either the electromagnetic switch 17 in the circuit of the motor 10 or the electromagnetic switch 18 in the circuit of the motor 11, depending upon the position of the switch member 19 of the relay. The selector relay 15 is provided for controlling either the electromagnetic switch 20 in the circuit of the motor 12 or the electromagnetic switch 21 in the circuit of the motor 13, depending upon the position of the switch member 22 of this relay. The selector relay 16 is provided for establishing a circuit through either the switch member 19 of the relay 14 or the switch member 22 of the relay 15, depending upon the position of the switch member 23 of this relay 16.

Each of these relays 14, 15 and 16 may be similar insofar as the general construction, arrangement and principles of operation are concerned, so that it will suffice to explain one of the relays, as, for example, the relay 14. This relay comprises two series lockout type electromagnets 24 and 25 which have their windings connected in series with each other and with the windings of the other relays to the supply conductor 26. The series lockout type electromagnets are diagrammatically shown as of the type disclosed in the patent to Harry B. Canfield No. 1,344,260, dated June 22, 1920. The electromagnet 24 is provided with a movable magnetic member or plunger 27 which is adapted to cooperate with the left-hand end of the pivoted switch member 19 so as to tilt this switch member from the position shown in the drawing to the position at which a circuit is made through this end of the switch member. The electromagnet 25 is also provided with a movable magnetic member or plunger 28, and this plunger is adapted to cooperate with the right-hand end of the switch member 19 to tilt the switch member to the position shown in the drawing in which a circuit is made through the right-hand end of the switch member to energize the shunt winding 29 of the contactor 18. The electromagnets 27 and 28 are adapted to operate at different values of current, as, for example, the electromagnet 24 may be adjusted to operate to tilt the switch member 19 when a value of current of one ampere passes through the magnet winding, but the plunger 27 of this electromagnet will be magnetically held from operating in case the value of current through the magnet winding is above the calibrated value of one ampere. In case the value of the current is materially less than one ampere, the plunger 27 will remain in its biased position. The electromagnet 25 may be adjusted to operate at two amperes and be magnetically held from operating at other values of current. This lockout type of electromagnet which magnetically operates within one range of values of current through the magnet winding and which is magnetically held from operation at other values of current, is a well known type of electromagnet.

The relay 15 is provided with a series lockout type electromagnet 30 and another series lockout type electromagnet 31. The relay 16 is provided with a series lockout type electromagnet 32 and another series lockout type electromagnet 33. These electromagnets may be adjusted to operate at different current values as will be explained later.

In order to control the selective operation of these selector relays, I have provided an arrangement for limiting the initial value of current through the conductor 26 and hence through the windings of the lockout electromagnets. This arrangement may take the form of a controller which I have illustrated in a very simplified diagram at the top of the figure. The switch 34 is adapted to close a circuit through the current responsive relay 35 and the limiting resistor 36 from the source of supply 37. This limiting resistor may be of such a value that, for example, one ampere may flow from the source through the current responsive relay, the supply conductor 26 and the windings of the lockout type electromagnets to the ground return. When this value of current is permitted to pass, the relay 35 will be energized to close its contacts against the action of the dash pot 38 so as to thereby energize the winding of the line contactor 39. The switch 40 is provided for including the limiting resistor 41 in the circuit of the current responsive relay 42 and the windings of the lockout type selector relays. With this resistor in circuit, two amperes, for example, may be permitted to flow through the circuit. The switch 43 is provided for connecting the resistor 44 in circuit with the relay 45 so that, for example, this current will be three amperes, and the switch 46 is provided for connecting the resistor 47 in the circuit of the relay 48 so that, for example, the current will be four amperes.

The switches 46, 43, 40 and 34 are connected together in such a manner that only one switch may be closed at a time. In order to illustrate a simple arrangement whereby this result may be effected, I have indicated the switch blades as being mechanically connected to each other through the insulating take-up string 49, which is of such a length that only one switch blade may be in the closed position at a time. The controller 50 is provided for establishing the main power circuit for the particular motor which has been selected. This controller has a plurality of operative positions at which the speed regulating resistor 51 is controlled in a step-by-step manner well understood by those skilled in the art.

With the parts in their respective positions shown in the drawings, and with the current relay 35 adjusted to close its contacts with one ampere through its winding, the relay 42 with two amperes, the relay 45 with three amperes, the relay 48 with four amperes, the electromagnet 27 of the relay 14 adjusted to operate at one ampere through its winding, the electromagnet 28 at two amperes through its winding, the electromagnet 30 of the relay 15 adjusted to operate at three amperes through its winding, the electromagnet 31 at four amperes, the electromagnet 32 of the relay 16 adjusted to operate at either one or two amperes through its winding, and the electromagnet 33 at either three or four amperes through its winding, the operation of my invention is as follows, it being understood that I have selected the previously mentioned operating values merely to explain the principles of the invention. The disconnecting switch 52 will first be closed, thereby establishing a circuit from the source of supply through the switch blade 43, the limiting resistor 44, through the windings of the current responsive relay 45, the supply conductor 26, through the windings of the electromagnets 24, 25, 30, 31, 32, and 33 in series to the ground return. The value of current through this circuit will be limited to three amperes by the resistor 44, so that the plunger of the electromagnet 33 of the relay 16 will operate, but this will have no effect on the switch member 23 of the relay, since this switch member is already in the proper position. The electromagnet 30 of the relay 15 will simultaneously operate to tilt the switch member 22 of the relay 15 clockwise so that a circuit is made from the supply conductor 26 through the right-hand end of the switch member 23, the left-hand end of the switch member 22, through the winding of the contactor 20 to the ground return, thereby energizing this contactor to close and connect the motor armature to the source of supply 37 through a comparatively high resistance circuit.

It will also be observed that the series relay 45 will be energized to close its contacts after an interval of time determined by the setting of the dash pot 53, and the winding of the line contactor 39 will be energized directly from the source of supply 37 when this relay closes its contacts. It will be observed, however, that the line contactor 39 is not energized to close until after an interval of time during which the selector relays have had an opportunity to function and establish the desired selection. The controller 50 may be moved to its first operative position, thereby establishing a power circuit for the motor 12 so that this motor will begin to rotate. The acceleration of the motor may be governed by means of the resistance 51. When the motor 12 has increased to such a speed that it has generated a predetermined counterelectromotive force, the relay 54 is energized to open its contacts and thereby open the circuit established by the closing of the switch 43. No further selection is possible while the motor 12 is operating because of the fact that the selection circuit is open.

The contactor 20 is provided with a series winding, so that as long as an appreciable value of current is flowing in the motor circuit, this contactor will be maintained closed, even though the selection circuit is opened. When the main controller 50 is returned to the off position, and the motor circuit of motor 12 is thus opened, the relay 54 will finally reclose its contacts so that another selection of motors may be had if desired. However, if no other one of the selector switches 46, 43, 40 and 34 is operated, if the main controller is moved to an operative position, the motor 12 will be energized to again operate.

Let it then be assumed that the main controller 50 is in the off position and it is desired to select the motor 10: the selector switch 43 will be opened and the selector switch 34 will be closed, thereby energizing a circuit including the resistor 36, the relay 35, supply conductor 26, through the windings of the selector relays to the ground return. The electromagnet 24 of the relay 14 will be energized to cause the plunger 27 to tilt the switch member 19 clockwise, so that the left-hand end of this pivoted switch member makes engagement with its corresponding stationary contact. The electromagnet 32 will be energized to cause the left-hand end of the pivoted switch member 23 of the relay 16 to be tilted clockwise, so that the left-hand end of this switch member will make engagement with its respective stationary contact. The value of current of one ampere is insufficient to cause the operation of any other of the electromagnets of the selector relays. A brief interval of time after the selection has been accomplished by the operation of the selector relays, the relay 35 is energized to close and thereby energizes the line contactor 39 to close. When the main controller 50 is turned to its first operative position the motor 10 is energized from the source of supply through the contactor 17, the shunt winding of which is energized through the switch members of the relays 14 and 16.

With the switches 46, 43, 40 and 34 in their respective open positions, in order to select and energize the motor 11, the selector switch 40 will be closed, thereby energizing the electromagnet 25 of the relay 14 to shift the switch member 19 of this relay to the position shown in the drawing, and the electromagnet 32 of the relay 16 will be energized to shift the switch member 23 of this relay (if this switch member is not already in proper position) so that the left-hand end of the switch member makes engagement with its respective stationary contact. The electromagnet 27 is magnetically held from operating and the value of current is insufficient for the electromagnets 30, 31 and 33 to operate. The contactor 18 is thereby energized to close and the line contactor 39 is energized to close an interval of time thereafter by the operation of the relay 42. Similarly, in order to select the motor 13, with the selector switches in their respective open positions, by closing the selector switch 46, the switch members of the selector relays will be operated to their respective positions shown in the drawings, thereby energizing the contactor 21. The line contactor 39 will be energized to close an interval thereafter by the operation of the relay 48.

It will thus be seen that any one of the motors 10, 11, 12 and 13 will be selected for operation at will at a point remote from the motors by a very simple and effective arrangement. It will also be observed that a single conductor is necessary between the remote control station and the supply conductor 26, and that not only is the selection of the motors accomplished but the regulation of the motors after the desired selection has been established is also accomplished through this single conductor which connects the remote control station with the place at which the motors are located. Furthermore, in case the power supply sould fail, the line contactor 39 will open. If the power should be restored with the controller in a running position, no different selection will be made than was had previously because of the fact that relays 14, 15 and 16 will either be magnetically held from operating or will operate the same as previously. That is because of the inherent characteristics of the series lockout type of switch. If the power is restored after a failure thereof and the controller is in a running position, the current through the supply conductor will either be of such a high value that the selector relays 14, 15 and 16 will be magnetically held from operating to select a different path, or if the current is limited by reason of the fact that the line contactor 39 does not close until after the selected one of the relays 48, 45, 42 or 35 has operated, the current through the supply conductor will be limited in the same manner as during the initial selective operation so that the relays 14, 15, and 16 will not operate to effect a different selection than the selection previoulsy determined upon.

Referring now to Fig. 2, it will be seen that I have embodied the general principles of the foregoing arrangement in a selective control system for electric vehicles or the like. The arrangement is used for controlling the direction of operation of the vehicle driving motors, and the vehicles are protected by a block system so as to prevent collisions between vehicles. Referring to the drawing, the electric vehicle 55 is adapted to travel back and forth on the tracks 56 and 57. This vehicle is provided with driving motors 58, 59, 60 and 61, the direction of operation of which is under the control of the electromagnetic reversing switch 62. This electromagnetic reversing switch is under the control of the selector relay 63 which is similar in construction and principles of operation to the selector relays 14, 15 and 16 of Fig. 1. The master controller designated 64 is provided for controlling the selection of the direction of operation of the vehicle. This controller has an off position and an operative position on each side of the off position. When this controller is turned from its off position toward the right to its operative position, the selection is made for forward vehicle operation. When this controller is turned toward the left to its operative position, the motors are caused to operate in the reverse direction.

A selective relay means is provided for controlling the establishment of a main power circuit between the source of supply designated by the conductor 65 and the trolley wire supply conductor 66. This relay means comprises the two electromagnetic switches 67 and 68 which are each of the series lockout type. The electromagnetic switch 67 is constructed and arranged so as to operate at the same value of current as the electromagnet 69 of the relay 63, and the electromagnetic switch 68 is constructed and arranged so as to operate at the same value of current as the electromagnet 70 of the relay 63. The electromagnetic line switch 71 is under the control of the electromagnetic switches 67 and 68, and the electromagnetic relay 72 is provided for insuring that the line contactor 71 will not be closed until after the selection determined by the master switch 64 has been established.

After the selection of the direction of operation has been made and the circuit of the driving motors 58, 59, 60 and 61 has been established, these motors are automatically accelerated step by step by means of the resistors 73, 74, 75 and 76. The contactor 77 is provided for short circuiting the resistor 73 and when the current has dropped to an appreciable value the contactor 78 is energized to short circuit the resistor 74. When the current has dropped to the predetermined value, the current limit relay associated with this contactor will drop its contacts and energize the winding of the contactor 79 so as to short circuit the resistor 75, and when the current taken by the motors has again dropped to the predetermined value, the current limit relay associated with the contactor 79 will drop and energize the contactor 80 to short circuit the resistor 76 and connect the motors directly to the source of supply with the resistors excluded from the circuit. These contactors 77 to 80 inclusive are of a type well known by those skilled in the art. The overload circuit breaker 81 is provided for opening up the circuit of the resistor contactors in case an overload should occur so as to reinsert the resistance and protect the motors.

In order to make easy an understanding of the arrangement as a whole, the operation of the equipment of Fig. 2 thus far described will be explained. The selective device 63 and the electromagnetic reversing switch arrangement 62 are in their respective positions for forward vehicle operation so that in case the operator desires that the car 55 shall proceed in the forward direction (from the left to the right) he will throw the master controller 64 from the off position (that shown in the drawing) to its right hand position. A circuit is thereby completed which may be traced as follows: from the source of supply 65, upper segments of the master controller 64, contacts of the circuit breaker 81, lower left hand contacts of the master switch 64, through the limiting resistors 82, windings of the electromagnetic selective switches 67 and 68, winding of relay 72, supply conductor 66, through the trolley of the vehicle, windings of the electromagnets 69 and 70, through the motors 58, 59, 60 and 61 in multiple to the ground return. The electromagnetic switch 68 will operate, thereby partially completing at its upper switch contacts the winding circuit for the electromagnetic line switch 71. The line switch 71 will not be energized to close until after the delayed action relay 72 is energized to close the contacts against the action of its dash pot. This gives an appreciable interval of time within which the selector relay 63 may have time to operate to give the selection in case this relay is not already in the proper position. When the relay 72 closes the line switch 71 will thereupon be energized to close and establish a circuit from the source of supply 65 through the resistors 73, 74, 75 and 76 to the supply contactor 66, thereby applying substantially full supply circuit potential to this supply conductor. When the contactor 71 closes it completes at its auxiliary switch a maintaining circuit for its winding through the middle contacts of the block protective relay 83 since there is another car on the next block. The electromagnetic failure of voltage protective relay 84 will be energized to close its contacts and establish a circuit from the supply conductor 66 through the contacts of relay 84, the left hand contact of the relay 63, the left hand winding of the electromagnetic reversing switch 62 and the shunt coil of the line contactor 85 to ground. The reversing switch 62 is already in its proper position so that the line contactor 85 will be energized to close, thereby completing a circuit from the supply conductor 66 through the contacts of the contactor 85, series holding winding of this contactor to the driving motors 58, 59, 60 and 61 in multiple to the ground return. The contactor 85 will be maintained closed by its series winding and the line contactor 71 will be maintained closed through its maintaining circuit. The contactor 86 will also be energized to close since the winding of this contactor is in series with the motor circuit. The winding of the accelerating contactor 77 is thus energized and this contactor will close. The contactors 78, 79 and 80 will be energized to close in succession to successively short circuit the accelerating resistors in accordance with the current taken by the driving motors in a manner well understood by those skilled in the art.

Assume that after the driving motors have operated the vehicle 55 for a short distance, it is desired to reverse the direction of vehicle operation. The master controller 64 will be returned to its off position thereby deenergizing the winding of the line contactor 71. This will open up the connection to the source of supply so that the driving motors will be deenergized, the contactor 85 will open, contactor 86 will be opened thereby deenergizing the resistor contactors 77 to 80 inclusive and the relay 72 will be also deenergized. To reverse the direction of vehicle operation, the master controller 64 will be turned toward the left to its operative position, thereby establishing a circuit from the source of supply through the upper right hand segments of the master switch, the contacts of the circuit breaker 81, the lower right hand segments of the master switch 64 through the limiting resistor 87, windings of selector relays 67 and 68, winding of relay 72, supply conductor 66, the windings of selector relay 63 to the ground return through the driving motors. The value of the resistor 87 included in this circuit will be such that the movable member of the electromagnet 69 of the selector relay 63 will not operate, but the movable magnetic member of the electromagnet 70 will operate and thereby tilt the switch member of this relay so as to make electrical contact with the right hand relay contact and opening the circuit through the left hand relay contact. The relay 72 will now close, thereby energizing the line contactor 71 to close, the circuit for the winding of this contactor being through the upper contacts of the relay 67 and the contacts of the relay 72 to the ground return. The contactor 71 will be maintained closed through the holding circuit previously traced. Substantially full supply circuit potential will thereby be applied to the failure of voltage protective relay 84 so that this relay will close, thereby energizing the right hand coil of the elctromagnetic reversing switch 62 through the right hand contact of the selector relay 63. When the reversing switch 62 operates, the shunt winding of the line contactor 85 is energized and this contactor completes the circuit for the driving motors from the supply conductor 66.

The block protective system whereby collisions between vehicles is prevented will now be described. As shown in the drawing, a motor vehicle 88 is on the next adjacent block to the block in which the motor vehicle 55 is located. The signal battery 89 is thereby short circuited by the vehicle 88 so that the winding of the relay 83 is deenergized. With the vehicle 88 on the next adjacent block to the block in which the motor vehicle 55 is located, as the motor vehicle 55 is operated in the forward direction until the trolley of this vehicle passes from the supply conductor 66 to the insulated intermediate conductor 90, the supply of power to the motor vehicle 55 will be discontinued because of the fact that the intermediate supply conductor 90 is not connected to the source of supply 65. The vehicle 55 will thereby be automatically brought to rest and will be prevented from proceeding into the next block if there is a vehicle in the next adjacent block. Assume that the vehicle 88 proceeds in the forward direction past the block on which it is located, the battery 89 will thereupon energize the winding of the relay 83 so that this relay will operate and energize the winding for the sectionalizing contactor 91 through the upper contacts of the relay 83. The contactor 91 will thereby be energized to close and connect the section supply conductor 91 to the source of supply 65. The winding of the line contactor 71 will be maintained energized through the lower contacts of the relay 83 and the auxiliary contacts of the sectional contactor 91. The vehicle 55 will thereby be advanced from the sectional conductor 90 to the supply conductor 92. In case the master switch 93 of the control arrangement for the next block is in the open position, the vehicle automatically stops. The control arrangement for the supply conductor 92 is the same as that for the supply conductor 66 and it is believed that those skilled in the art will understand the operation of the arrangement to the right of the drawings from the description which has been previously given of the similar arrangement to the left of the drawing. With the parts in their respective positions as shown in the drawing, the vehicle 55 being in one block and the vehicle 88 in the next block, the vehicle 88 may be operated back and forth within its own block in the same manner as that previously described for the operation of the vehicle 55 in the first block. In case the master controllers for the respective blocks are all set for forward vehicle operation, a vehicle will be caused to automatically proceed from the left to the right, passing from one block to the other the same as if there were no block protection. However, in case one of the master controllers is in the off position, the vehicle will stop in the block controlled by that master switch, or in case the vehicle proceeding in a forward direction attempts to advance into a block in which another vehicle is located, the advancing vehicle will be automatically stopped at the sectional conductor between the two blocks so that a collision between vehicles will thereby be prevented.

In order to give a visual signal as to the operation of the selective devices so that operator may know the particular direction of vehicle operation which has been selected, the selector relay 68 is provided with a lower auxiliary switch 93 which closes the circuit for a lamp 94 located adjacent to the position of the operator. When this lamp lights, the operator will know that the forward direction of vehicle operation has been selected. The lamp 95 will be similarly lighted by the operation of the relay 67 when the reverse direction of vehicle operation has been selected.

It may sometimes be advisable that the operator shall be able to advance a vehicle at will from one station to the other irrespective of the fact that a vehicle may be located in the next adjacent block. In Figure 3 I have shown an arrangement whereby such a result may be accomplished. The arrangement of this figure is such that the operator of the block or section to the left may energize the contactor $91^1$ by closing the pushbutton 96. In case the contactor 97 between the sectional conductor 90 and the supply conductor 92 is in the open position as shown, the closing of the pushbutton 96 will energize the contactor $91^1$ to close so that the sectional conductor 90 is energized from the supply conductor 66. If the operator for the block or section to the left having thus advanced the vehicle into the intermediate section between the two blocks, if the operator for the block or section to the right desires that the vehicle proceed into the block controlled by him, he will close the pushbutton 98, and in case the pushbutton 96 has been opened and the contactor 91¹ thereby opened, the contactor 97 will thereby be closed so that the sectional conductor 90 may be energized from the supply conductor 92, and the vehicle advanced under the control of operator controlling the block in which the supply conductor 92 is located.

In case it is advisable to provide a switching arrangement whereby vehicles may pass each other under the control of the operators of the various blocks, this may be done as shown in Figure 4. Assume that the vehicle has proceeded from the supply conductor 66 to the sectional conductor 90 in the manner described in connection with the arrangement of Figure 2, if the operator controlling the supply conductor 92 operates a vehicle in the reverse direction so that this vehicle is in the branch track for which the sectional conductor 90¹ is provided, the vehicle proceeding from the left may be advanced to the supply conductor 92 by the operator at the station at the right closing the pushbutton 99. The contactor 100 is thereby energized to close and the sectional conductor 90 is connected with the supply conductor 92. The operator of the block to the left may cause the other vehicle to proceed to the supply conductor 66 by closing the pushbutton 101, thereby energizing the contactor 102 to close and connect the sectional conductor 90¹ with the supply conductor 66.

In accordance with the provisions of the Patent Statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is,—

1. The combination in a selective control system of a supply conductor, a switch member, means operated responsively to one value of current through the supply conductor for operating the said switch member to select one portion of a plurality of paths for the current from the supply conductor, and means operated responsively to another value of current through the supply conductor and the first means for operating the said switch member to select another portion of the said paths for the current from the supply conductor.

2. The combination in a selective control system of a supply conductor, means magnetically operated at one value of current in one direction through the said conductor for selecting one portion of a plurality of paths for the current from the said conductor, and means magnetically operated only at another value of current in the same direction through the said conductor and the first means for selecting another portion of the said paths for the current from the supply conductor.

3. The combination in a selective control system of a supply conductor, means magnetically operated at one value of current through the said conductor and magnetically prevented from operating at other values of current for selecting one portion of a plurality of paths for the current from the said supply conductor, and a second means magnetically operated at a different value of current through the said conductor and the first means for selecting another portion of the said paths for the current from the supply conductor, the said second means magnetically prevented from operating at other values of current than its operating value.

4. The combination in a selective system of control of a supply conductor, switch mechanism for selecting any portion of a plurality of paths from the said conductor, and a plurality of series connected electroresponsive devices energized from the said conductor for separately controlling the said switch mechanism, each of said devices operated responsively only to one selected range of values of current in one direction through the said conductor.

5. The combination in a selective system of control of a supply conductor, switch mechanism for selecting any portion of a plurality of paths from the said conductor, and a plurality of lockout type electromagnets energized in series from the said conductor for separately controlling the said switch mechanism, the said electromagnets arranged to operate selectively at different values of current.

6. The combination in a selective system of control of a supply conductor, a switch member for controlling the selection of either of two paths from the supply conductor, a lockout type electromagnet for operating the switch member to one selecting position in response to one value of current through the conductor, and a second lockout type electromagnet for operating the switch member to a second selecting position in response to a different value of current through the conductor.

7. The combination in a selective control system of a supply conductor, switch mechanism for selectively controlling the establishment of any portion of a plurality of paths from the said conductor, a plurality of lockout type electromagnets connected in series for controlling the said switch mechanism, the said electromagnets arranged to selectively operate at different values of current, and a controller for regulating the value of current through the said electromagnets to control the selection of the said paths.

8. A selective device comprising a switch member, means for operating the switch member to a plurality of positions, comprising a plurality of lockout type electromagnets having their windings connected in series relation, each of said electromagnets having a movable magnetic member arranged to cooperate with the switch member for separately moving the same, the said electromagnets adjusted to operate their respective magnetic members only within a predetermined range of values of current through the electromagnets, the operating ranges of the values of current for the electromagnets being different for the respective electromagnets.

9. The combination in a selective control system of a supply conductor, means operated responsively to the value of current through the said conductor for selecting any portion of a plurality of main power paths from the conductor, a source of supply, electroresponsive switch mechanism for closing a main power circuit from the said source to the said conductor, a master controller, and means under the control of the said controller and operated responsively to the current through the first mentioned means for controlling the said switch mechanism.

10. The combination in a selective control system of a supply conductor, an electromagnetic selector relay connected to the said conductor for controlling the selection of any portion of a plurality of separate paths from the said conductor, a source of supply, electroresponsive switch mechanism for closing a main power circuit from the said source to the said conductor, a master controller, electromagnetic selector relay means under the control of the said controller for controlling the said switch mechanism, and connections between the said relay means and the said controller whereby the said switch mechanism is only closed when the selection determined by the controller has been made.

11. The combination in a selective control system of a supply conductor, means operated responsively to the value of current through the supply conductor for selecting any portion of a plurality of paths for the current from the supply conductor, a source of supply, a contactor for closing the connection between the said source and the said supply conductor, a master controller for limiting the value of current through the supply conductor to control the selection of the desired portion of the paths from the said supply conductor, means operated responsively to the limited value of current determined by the said controller for controlling the said contactor, and connections between the last mentioned means and the said contactor whereby the contactor is only closed when the selection determined by the said controller has been made.

12. The combination in a motor vehicle selective control system, of a trolley wire, a motor vehicle connected to be operated by power from the said trolley wire, electroresponsive switch mechanism for controlling the direction of operation of the vehicle, a selector relay energized from the trolley wire for controlling the said switch mechanism, the said relay having two lockout type operating electromagnets each of which is energized to operate at a different value of current, a line contactor controlling the connection of the trolley wire to a source of supply, a master controller for controlling the direction of vehicle operation, selector relay means under the control of the said controller for controlling the said line contactor, and connections whereby the said contactor is closed only when the selection determined by the said controller has been made.

13. The combination in a block railway selective control system of two main trolley wires, an insulated section trolley wire between the said main trolley wires, a track having two sections insulated from each other, a motor vehicle connected to be energized from the first trolley wire, electroresponsive means controlled from one of said track sections for connecting the said insulated section trolley wire to the said first main trolley wire in case there is no motor vehicle on the next section of track, and a control system for each of said main trolley wires and the motor vehicle energized therefrom, each of said control systems comprising current responsive means on the vehicle for selecting for forward or reverse vehicle operation, and a controller for controlling the connection of the main trolley wire to a source of supply and for controlling the selective operation of the said current responsive means.

In witness whereof, I have hereunto set my hand this 21st day of March, 1922.

CHARLES B. CONNELY.